US011700290B1

(12) United States Patent
Chiang et al.

(10) Patent No.: US 11,700,290 B1
(45) Date of Patent: Jul. 11, 2023

(54) SILENT RETRY IN A LEGACY SYSTEM

(71) Applicant: T-Mobile USA, Inc., Bellevue, WA (US)

(72) Inventors: Hsin Fu Henry Chiang, Bellevue, WA (US); Joel Arends, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/470,781

(22) Filed: Sep. 9, 2021

(51) Int. Cl.
*H04L 65/1069* (2022.01)
*H04W 80/10* (2009.01)
*H04W 84/04* (2009.01)

(52) U.S. Cl.
CPC ......... *H04L 65/1069* (2013.01); *H04W 80/10* (2013.01); *H04W 84/042* (2013.01)

(58) Field of Classification Search
CPC .. H04L 65/1069; H04W 80/10; H04W 84/042
See application file for complete search history.

(56) References Cited

U.S. PATENT DOCUMENTS

| | | | | |
|---|---|---|---|---|
| 2017/0181215 A1* | 6/2017 | Gaur | .................... | H04L 65/1016 |
| 2019/0306923 A1* | 10/2019 | Xiong | ................... | H04L 5/0051 |
| 2019/0394630 A1* | 12/2019 | Chiang | ............... | H04L 65/1069 |
| 2020/0228936 A1* | 7/2020 | Talebi Fard | ............ | H04W 4/08 |
| 2021/0368319 A1* | 11/2021 | Bakker | ............. | H04W 36/0022 |
| 2022/0046119 A1* | 2/2022 | Chandrasekaran | ..... | H04W 4/90 |

* cited by examiner

*Primary Examiner* — Kristie D Shingles
(74) *Attorney, Agent, or Firm* — Lee & Hayes, P.C.

(57) ABSTRACT

Techniques and systems for selectively implementing a silent retry procedure after a voice session has moved from a preferred IP-based system (e.g., 5GS) to a legacy IP-based system (e.g., EPS) are disclosed. The silent retry procedure may be implemented by a UE and/or by a TAS using one or more specific error codes and/or timeouts. In this manner, after a voice session has been redirected or handed over from a preferred system (e.g., 5GS) to a legacy system (e.g., EPS), and based on an issue arising that prevents the voice session from being successfully established thereafter, the UE or the TAS may reattempt to establish the voice session directly in the legacy system, instead of allowing the UE to transition back to the preferred system (e.g., 5GS) after a session failure in the legacy system, which increases the overall success rate of establishing voice sessions.

20 Claims, 6 Drawing Sheets

SILENT RETRY IN A LEGACY SYSTEM

BACKGROUND

A fifth generation system (5GS) provides various benefits over predecessor or legacy systems. For instance, a 5GS may provide higher data-rate throughput than available legacy systems. It is expected, however, that the transition from fourth generation (4G) Long Term Evolution (LTE) to 5G standalone architecture (SA) will take years to complete. During this transition period, telecommunication networks will remain heterogenous, which means that, for now, the evolved packet system (EPS) is an available legacy system to support legacy devices and/or to serve as a fallback option for 5G-capable user equipment (UEs). For example, EPS fallback (EPS-FB) is a procedure defined in the 3rd generation partnership project (3GPP) technical specification (TS) 23.502 for moving a voice session from 5GS to EPS on-the-fly. However, EPS-FB calls are prone to issues, which results in a number of failed EPS-FB calls. For instance, a UE may take too long to respond to a telephony application server (TAS) during the EPS-FB procedure, and, as a consequence, the user's call may be dropped.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and systems for selectively implementing a silent retry procedure after a voice session has moved from a preferred Internet Protocol (IP)-based system (e.g., 5GS) to a legacy IP-based system (e.g., EPS) in order to increase the overall success rate of establishing voice sessions. The silent retry procedure may be implemented by a UE on the client side and/or by a TAS on the network side. Furthermore, the silent retry procedure may be implemented selectively using one or more specific error codes and/or timeouts, as described in more detail below. In this manner, after a voice session has been redirected or handed over from a preferred system (e.g., 5GS) to a legacy system (e.g., EPS), and based on an issue arising that prevents the voice session from being successfully established thereafter, the UE or the TAS may reattempt to establish the voice session directly in the legacy system instead of allowing the UE to transition back to the preferred system (e.g., 5GS) after a session failure in the legacy system.

In an illustrative example, when a user dials or selects a phone number on a UE (e.g., a mobile phone) to make a call, the UE (acting as a MO UE) may send a first request to establish a first voice session (e.g., a voice over new radio (VoNR) call) in 5GS. During the setup of the voice session in 5GS, a next generation radio access network (NG-RAN) may trigger a fallback, or may otherwise initiate a handover of the voice session, to EPS. For example, a redirection of the voice session from 5GS to EPS may be part of an EPS-FB procedure initiated by the NG-RAN. Alternatively, a handover of the voice session from 5GS to EPS may be part of a VoNR-to-voice over LTE (VoLTE) handover, such as when the UE moves to a geographical location within a LTE-only coverage area. In either case, the UE may determine that the voice session is being redirected or handed over to EPS, and the UE may continue to establish the voice session in EPS. If everything goes smoothly, the voice session can stay in the EPS for the duration of the voice session. In this scenario, after the user hangs up, the UE may reattach to 5GS.

As mentioned above, however, EPS-FB calls are prone to issues, which means that the voice session may fail after moving to EPS from 5GS. In this scenario, as the voice session continues to be setup in EPS, something may prevent successful establishment of the voice session in EPS. For example, the UE may be unable to find an LTE cell due to an incorrect 5G cell-to-LTE neighbor cell configuration, and/or the UE may fail to attach to EPS due to 5GS-to-EPS security information being out of synchronization, and/or the UE may take too long to respond to a TAS that is responsible for setting up the voice session in EPS. In any case, if something prevents successful establishment of the voice session in EPS, the UE may receive a message (e.g., a CANCEL message, a BYE message, etc.) to tear down the first voice session. The message received by the UE may include a specific error code that indicates the establishment of the first voice session in EPS has failed. Based at least in part on receiving this message including the specific error code, the UE may implement a silent retry procedure. The type(s) of error code(s) that trigger(s) the silent retry procedure is/are configurable to allow for selectively implementing the silent retry procedure exclusively when a predefined error code is received by the UE. The retry procedure is "silent" in the sense that it is implemented automatically by the UE, without user intervention or user action. Accordingly, based at least in part on receiving the message including the specific error code in the above-described scenario, the UE may automatically (i.e., without user intervention) send a new, second request to establish a new, second voice session in EPS, such as by sending a Session Initiation Protocol (SIP) request using the SIP INVITE method to establish the voice session (e.g., a VoLTE call) in EPS.

Also disclosed herein is a silent retry procedure that may be implemented by a TAS with respect to a MT UE. In an illustrative example, a UE may register for services of a telecommunication provider, and during that registration process, a TAS may identify a user agent client associated with the UE as an EPS-FB client or a VoNR client. The user agent client may be identified as such from information in a header field of the registration request that the TAS received from the UE. At some later time, when a remote user dials or selects a phone number associated with the registered UE, the TAS may send, to the registered UE (acting as a MT UE) a first SIP request using the SIP INVITE method to establish a first voice session in EPS. For example, the NG-RAN may have triggered a fallback, or may have otherwise initiated a handover of the voice session, to EPS, as described above, which caused the TAS to send the first SIP request to the MT UE to establish the first voice session in EPS. Subsequently, the TAS may determine that a trigger event has occurred to initiate a silent retry procedure. For example, the trigger event may be a lapse of a predetermined period of time since the TAS sent the first SIP request without having received a 18x response from the UE. Alternatively, the trigger event may be the receipt at the TAS of a message including a specific error code. Based at least in part on the occurrence of the trigger event, the TAS may send a message to the UE to tear down the first voice session, followed by a second SIP request using the SIP INVITE method to establish a new, second voice session in EPS for the UE acting as a MT UE.

The techniques and system described herein improve network reliability, and, hence, the call experience for a user of a telecommunication network by increasing the success rate of establishing voice sessions. For example, without the techniques and systems described herein, a user is forced to redial within a very brief time period (e.g., 5 to 10 seconds) from a time at which an EPS-FB call failed in order to have a better chance of establishing the desired voice session. In other words, if the user takes too long after a failed EPS-FB call to redial a phone number that the user dialed previously, the network will eventually move the UE back to 5GS, where the UE is likely to experience the same issues that prevent establishment of a voice session that is redirected or handed over from 5GS to EPS. The techniques, devices, and systems described herein may further allow one or more devices to conserve resources with respect to processing resources, memory resources, networking resources, power resources, etc., in the various ways described herein. For example, instead of a MO UE blindly reattempting to establish a failed voice session, the silent retry procedure described herein is a self-disciplined approach, meaning that a MO UE and/or a TAS selectively reattempts to establish a voice session in a legacy system (e.g., EPS) if a specific error code is received or if a specific timeout occurs. In other words, the type(s) of error code(s) and/or timeout(s) that trigger(s) the silent retry procedure is/are configurable to allow for selectively implementing the silent retry procedure, which means that less stress will be placed on the network by reducing the number of UEs reattempting to establish voice sessions at a given time. Thus, computing resources, such as networking resources, may be conserved using the techniques and systems described herein.

An example process to be implemented by a UE can include sending a first request to establish a first voice session in a 5GS, determining that the first voice session is to be redirected or handed over to an EPS, and continuing to establish the first voice session in the EPS. The process may further include receiving a message including an error code indicating that establishment of the first voice session in the EPS has failed, and sending, based at least in part on the receiving of the message including the error code, a second request to establish a second voice session in the EPS.

An example process to be implemented by a TAS can include receiving, from a UE, a request to register for one or more services of a telecommunication service provider, and identifying, based at least in part on information in a header field of the request, a user agent client associated with the UE as an EPS-FB client or a VoNR client. The process may further include sending, to the UE, a first SIP request using the SIP INVITE method to establish a first voice session in an EPS, and determining that a trigger event has occurred to initiate a silent retry procedure. Based at least in part on the trigger event, the TAS may send, to the UE, a message to tear down the first voice session, as well as a second SIP request using the SIP INVITE method to establish a second voice session in the EPS.

Also disclosed herein are systems and devices comprising one or more processors and one or more memories, as well as non-transitory computer-readable media storing computer-executable instructions that, when executed, by one or more processors perform various acts and/or processes disclosed herein. Although examples are described herein with respect to components of 5GS and EPS, it is to be appreciated that the techniques and systems described herein are not limited to 5GS and EPS implementations, and are applicable to any existing or future IP-based network technologies or evolutions of existing IP-based network technologies.

Figure 1:
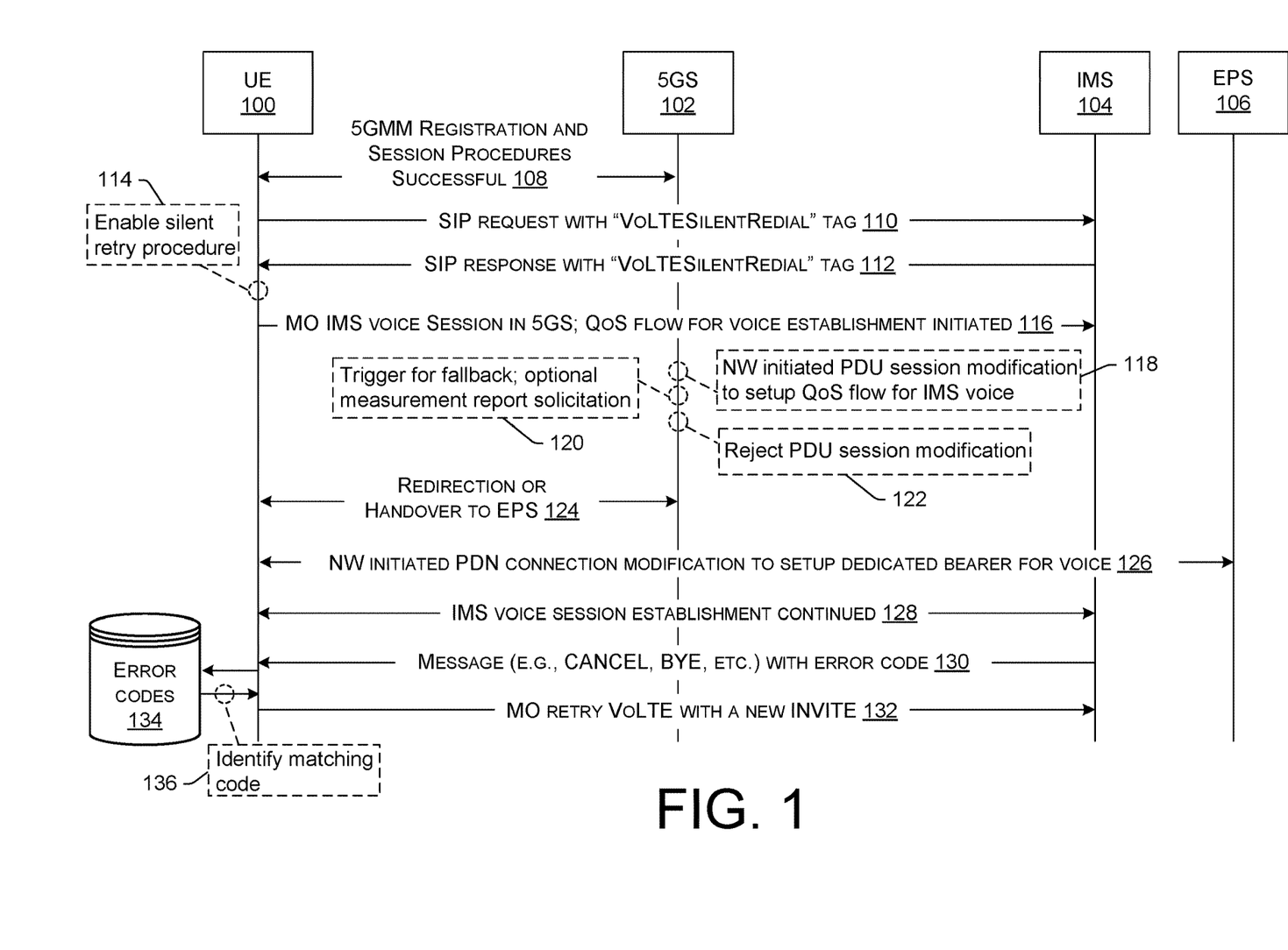
FIG. 1 is a diagram illustrating example signaling between a UE (acting as a mobile originating (MO) UE) and example network nodes. The signaling depicted in FIG. 1 can be used to implement a silent retry procedure at the UE, according to various embodiments. The network nodes of FIG. 1 include network nodes of a 5GS, an Internet Protocol Multimedia Subsystem (IMS), and an EPS.

FIG. 1 is a diagram illustrating example signaling between a UE 100 (acting as a MO UE) and example network nodes. The signaling depicted in FIG. 1 can be used to implement a silent retry procedure at the UE 100, according to various embodiments. The network nodes of FIG. 1 include network nodes of a 5GS 102, an IMS 104, and an EPS 106. It is to be appreciated that each of the 5GS 102, the IMS 104, and/or the EPS 106 may in fact represent multiple nodes or a single node. It is also to be appreciated that additional nodes may be utilized in the process of implementing the silent retry procedure described herein, even though they are not depicted in FIG. 1, as would be recognized by a person having ordinary skill in the art.

In accordance with various embodiments described herein, the terms "user equipment (UE)," "wireless communication device," "wireless device," "communication device," "mobile device," "client device," "electronic device," and "device" may be used interchangeably herein to describe any UE (e.g., the UE 100 of FIG. 1, the UE 300 of FIG. 3, the UE 500 of FIG. 5, etc.) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), LTE, Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, VoNR, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology, including 5G NR network protocols, and/or existing or legacy network technology, such as 2G, 3G, 4G, including circuit-switched networking protocols and/or packet-switched networking protocols. The UE 100 (and/or the UE 300 of FIG. 3, and/or the UE 500 of FIG. 5) may be implemented as any suitable type of computing device configured to communicate over a wireless network, including, without limitation, a mobile phone (e.g., a smart phone/handset), a tablet computer, a laptop computer, a portable digital assistant (PDA), a wearable computer (e.g., electronic/smart glasses, a smart watch, fitness trackers, head-mounted display (HMD), etc.), an in-vehicle (e.g., in-car) computer, and/or any similar mobile device, as well as situated computing devices including, without limitation, a television (smart television), set-top-box (STB), desktop computer, and the like.

In general, a user can utilize a UE, such as the UE 100, to communicate with other computing devices of a telecommunications network via the IMS 104. The IMS 104 of FIG. 1 may represent, at least in part, the IMS core, which is sometimes referred to herein as "IMS core network," "IMS network," "Core Network (CN)," or "IM CN Subsystem". The IMS core is an architectural framework defined by the 3GPP for delivering IP multimedia to a UE, such as the UE 100. Accordingly, the IMS 104 can be maintained and/or operated by one or more service providers, such as one or more wireless carriers (or "operators"), that provide IMS-based services to users (sometimes called "subscribers") who are associated with UEs, such as the UE 100. For example, a service provider may offer multimedia telephony services that allow a subscribed user to call or message other users via an IMS core using his/her UE. A user can also utilize an associated UE to receive, provide, or otherwise interact with various different IMS-based services by accessing computing devices of an IMS core. In this manner, an operator of an IMS 104 may offer any type of IMS-based service, such as, telephony services, emergency services (e.g., E911), gaming services, instant messaging services, presence services, video conferencing services, social networking and sharing services, location-based services, push-to-talk services, real-time text (RTT) services, and so on. In order to access these services (e.g., telephony services), a UE is configured to request establishment of a communication session. In the case of telephony services, the communication session may comprise a voice session or a call (e.g., a VoNR call in the 5GS 102, a VoLTE call in the EPS 106, etc.).

The UE 100 of FIG. 1 is configured to utilize various access networks, including radio access networks (RANs) and/or radio access technologies (RATs), in order to access nodes of the IMS 104. UEs that are 5G NR-compliant may be configured to communicate with heterogeneous cellular networks by employing radios that can communicate over the 5GS 102 as well as over legacy or predecessor systems relative to 5GS 102, such as the EPS 106. Similarly, UEs that are 5G NR-compliant and/or 4G LTE-compliant may be configured to communicate within heterogeneous cellular networks by employing radios that can communicate over the EPS 106, as well as over legacy or predecessor systems relative to 4G systems, such as third generation (3G) and/or second generation (2G) networks. 3G/2G systems employ circuit-switching for voice communications, while 5GS 102 and EPS 106 employ packet-switching for both data and voice communications in an all-IP data transport technology. In general, 4G LTE-compliant UEs and 5G NR-compliant UEs are configured to prefer attachment to corresponding networks and/or systems, which offer relatively high data-rate throughput as compared to available legacy or predecessor networks and/or systems. In most UEs, a choice of which protocol to employ depends primarily on what networks and/or systems are available to the UE at the UE's present geographic location. Furthermore, in instances where the preferred network and/or system (e.g., 5GS 102) is unavailable or unusable for any reason, legacy networks (e.g., EPS 106), if available, may be used as a fallback protocol, such as by using a EPS-FB procedure, or, in the case of 3G/2G, a circuit-switch fallback (CSFB) mechanism. The UE 100 of FIG. 1 can comprise a UE with such capabilities to allow for communication over any type of telecommunications network.

FIG. 1 illustrates that the UE 100 may perform an initial attach procedure 108 in order to attach to a telecommunications network. In the example of FIG. 1, the UE 100 may send, to a node of the 5GS 102, a request to register for one or more services of a telecommunication service provider as part of the initial attach procedure 108. The 5GS 102 may represent a NG-RAN and 5G Core (5GC), where the 5GC can include various 5G nodes including, without limitation, an access and management function (AMF), authentication server function (AUSF), unified data function (UDM), session management function (SMF), user plane function (UPF, policy control function (PCF), application function (AF) and data network (DN). FIG. 1 illustrates a scenario where 5G Mobility Management (5GMM) registration and session procedures are successful in the initial attach procedure 108, and the attached UE 100 has established a radio link in order to transmit data to, and receive data from, particular ones of the nodes in the 5GS 102 and the IMS 104. Furthermore, the UE 100 is able to implement fallback and/or handover procedures to reattempt establishment of a voice session in a legacy system (e.g., EPS 106). It is to be appreciated that the initial attach procedure 108 may include, among other sub-procedures, requesting registration for one or more IMS-based services provided via the IMS 104 (e.g., IMS core). Registration of the UE 100 can involve identifying a P-CSCF node of the IMS 104 (e.g., IMS core), and sending a registration request via a NG-RAN of the 5GS 102 to an address of the identified P-CSCF node.

As used herein, a "request" is a message that is sent from a UE, such as the UE 100, to a network node. Meanwhile, a "response" is a message that is sent from a network node to a UE, such as the UE 100. This construct may be used when discussing communications that use any particular signaling protocol, SIP being one example protocol. For example, SIP may be used by the UE 100 for transmitting messages to/from a network node. Accordingly, a "SIP request" is a message that is sent from a UE, such as the UE 100, to a network node using SIP protocol, and a "SIP response" is a message that is sent from a network node to a UE, such as the UE 100, using SIP protocol. SIP is a signaling protocol that can be used to establish, modify, and terminate multimedia sessions (e.g., a multimedia telephony call, an emergency call, etc.) over packet networks, and to authenticate access to IMS-based services. Accordingly, during the initial attach procedure 108, the UE 100 may send a SIP request (e.g., a registration request) using the SIP REGISTER method as part of the initial procedures for establishing a multimedia communication session.

After the UE 100 has performed the initial attached procedure 108 and is attached to the 5GS 102, the UE 100 may inform the network that it is capable of implementing the silent retry procedure described herein, which is sometimes referred to herein as a "VoLTE Silent Redial" procedure. In addition, the network may inform the UE 100 that the UE 100 can (e.g., is authorized to) use the silent retry procedure described herein. This may be accomplished using a tag in a SIP request-SIP response interaction involving the UE 100. For example, as shown in FIG. 1, the UE 100 may send, to the IMS 104, a SIP request 110 including a tag (e.g., "VoLTESilentRedial" tag) to indicate that the UE 100 is capable of the silent retry procedure. The UE 100 may then receive, from the IMS 104, a SIP response 112 including the same tag (e.g., the "VoLTESilentRedial" tag) or a different tag to effectively enable the silent retry procedure at 114. This procedure to enable the silent retry procedure may be performed prior to the UE 100 requesting to establish a voice session, or the silent retry procedure may be enabled on a per-voice session basis. If the procedure to enable the silent retry procedure is performed on a per-voice session basis, the SIP request 110 may represent a SIP request using the SIP INVITE method to request establishment of a voice session (e.g., a VoNR call). Moreover, in some examples, the UE 100 may not send the SIP request 110. In this scenario, the silent redial procedure may be enabled on a permanent basis without the UE 100 having to interact with the network in order to enable the silent redial procedure.

At 116, a user of the UE 100 may initiate a voice session, such as a VoNR call, and, as a result, an MO IMS voice session establishment is initiated, including a Quality of Service (QoS) flow for the voice session. For example, the user can dial a number in any suitable fashion, such as by selecting an existing contact (e.g., a stored phone number), by dialing a phone number on a keypad (e.g., a soft keypad presented on a touch screen, or a physical keypad of the UE 100 having depressible buttons, etc.), by speaking an utterance (e.g., "Call Mom") that is detected by a microphone of the UE 100 and understood by voice recognition software, and so on. To initiate the voice session, the UE 100 may send a SIP request using the SIP INVITE method. This SIP request may be sent from the UE 100 (acting as a MO UE) to the IMS 104 (e.g., IMS core), and in particular, to a P-CSCF node of the IMS core. In the case where the silent retry procedure is enabled on a per-voice session basis, the SIP request 110 may be sent as part of the IMS voice session establishment at 116 using the SIP INVITE method. Otherwise, the SIP request using the SIP INVITE method to establish the voice session may omit a silent retry tag.

It is to be appreciated that the initial setup procedures for the voice session can include various actions and message transmissions by and between the UE 100 and various network nodes in addition to the example actions and message transmission described herein and shown in FIG. 1. In general, any suitable setup procedures known to a person having ordinary still in the art can be included in the initial setup procedures to establish a voice session for the UE 100 over a telecommunications network. Because network topologies vary between service providing entities, the signaling employed during attach procedures and setup procedures may vary. FIG. 1 illustrates an example where a network initiated protocol data unit (PDU) Session modification to setup QoS flow for IMS voice reaches the NG-RAN of the 5GS 102 at 118. The NG-RAN of the 5GS 102 is configured to support EPS-FB for IMS voice and, in the example of FIG. 1, the NG-RAN of the 5GS 102 triggers a fallback, or otherwise initiates a handover of the voice session, to EPS 106 at 120. The fallback or handover to EPS 106 may take into account the capabilities of the UE 100, an indication from the AMF of the 5GS 102 that "Redirection of EPS fallback for voice is possible" (received as part of initial context setup, handover resource allocation or path switch request acknowledge, as defined in TS 38.413 [10]), the network configuration (e.g., N26 availability configuration) and/or radio conditions, as defined in TS 23.502. At 120, the NG-RAN of the 5GS 102 may initiate a measurement report solicitation from the UE 100 including Evolved Universal Terrestrial Radio Access Network (E-UTRAN) as a target. Furthermore, the NG-RAN of the 5GS 102 may respond indicating a rejection of the PDU Session modification to setup QoS flow for IMS voice at 122, and the NG-RAN of the 5GS 102 may initiate a redirection or a handover to EPS 106 at 124, as defined in TS 23.502. A redirection at 124 may be a "release and redirect" procedure where the UE 100 is instructed to break from 5GS 102 and then establish the session in EPS 106. In another example, a handover at 124 may cause the UE 100 to establish the session in EPS 106 and then break from 5GS 102. The UE 100 may determine that the first voice session is to be redirected or handed over to EPS 106 at 124, such as by receiving an indication at 124 that the NG-RAN has initiated a redirection or a handover to EPS 106. In some examples, the UE 100 may initiate a tracking area update (TAU) procedure and/or the UE 100 may initiate an Attach with PDN connectivity request with request type "handover," as defined in TS 23.502.

At 126, one or more nodes of the 5GS 102 may re-initiate the setup of the dedicated bearer(s) and QoS flow for IMS voice, as defined in TS 23.502, and at 128, the IMS signaling related to IMS voice call establishment continues in EPS 106. Accordingly, at 128, the UE 100 may continue to establish the first voice session in EPS 106. However, at 128, instead of setting up a voice session (e.g., VoLTE call) successfully in EPS 106, something may prevent successful establishment of the voice session in EPS 106, and the UE 100 receives a message 130 including an error code (e.g., SIP 503) from the IMS 104. The message 130 (and/or the error code included in the message 130) indicates that establishment of the first voice session in EPS 106 has failed. For example, the message 130 may be a CANCEL message or a BYE message including a SIP 503 error code (sometimes referred to as a "response code" or "cause code"), which causes the call to drop while the UE 100 is in EPS 106. Based at least in part on the error code included in the received message 130, the UE 100 may perform the silent retry procedure at 132 by sending a second request to establish a second voice session in EPS 106. For example, the UE 100, at 132, may send a second SIP request using the SIP INVITE method to establish a new VoLTE call in EPS 106.

In some examples, the UE 100 may have downloaded, at some earlier point in time, a list 134 of one or more error codes that trigger the silent retry procedure in instances where the error code is received in a message 130 after a voice session has moved from a preferred IP-based system (e.g., 5GS 102) to a legacy IP-based system (e.g., EPS 106), as depicted in the example of FIG. 1. Thus, the UE 100 may hard code the list 134 of error code(s) that the network provides to the UE 100 ahead of time. In this manner, the UE 100 may compare the error code received in the message 130 to the list 134 of one or more error codes stored in memory of the UE 100, and may determine whether the error code matches any of the error code(s) in the list 134. If the UE 100 identifies a matching error code at 136 (e.g., by determining that the error code received in the message 130 matches one of the error code(s) in the list 134), the UE 100 may send the second request to establish the new, second voice session in EPS 106 at 132. Otherwise, the UE 100 may refrain from performing the silent retry procedure at 132. Thus, the UE 100 may implement a "self-disciplined" retry at 132 using a list 134 of one or more error codes so that the silent retry procedure is selectively implemented. In an illustrative example, the list 134 includes a single error code, such as SIP 503 Service Unavailable. In this example, if the UE 100 were to receive any other error code besides SIP 503 (e.g., SIP 504 Server Time-out) while the UE 100 is in EPS 106, the UE 100 would refrain from performing the silent retry procedure. It is to be appreciated, however, that this is merely an illustrative example, and the list 134 may be configurable to include any type of error code(s) and/or any number of error codes.

In some examples, the UE 100 is configured to perform the silent retry procedure at 132 within a threshold period of time (e.g., 5 seconds, 10 seconds, etc.) since receiving the message 130 including the error code. Performing the silent retry procedure quickly (e.g., within the threshold period of time) ensures that the UE 100 is not given a chance to move from EPS 106 back to 5GS 102 before the UE 100 attempts to establish the new, second voice session at 132, thereby avoiding the same problem that caused the UE 100 to receive the message 130 including the error code 130 in the first place, and thereby increasing the likelihood of successfully establishing the voice session in EPS 106. From the user's perspective, the user dials a number, and although it may seem like it takes longer than usual to establish the call (due to the issue causing the message 130 to be sent to the UE 100), the disclosed technique is an improvement over the alternative of repeated dropped calls, which is a frustrating user experience.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 2:
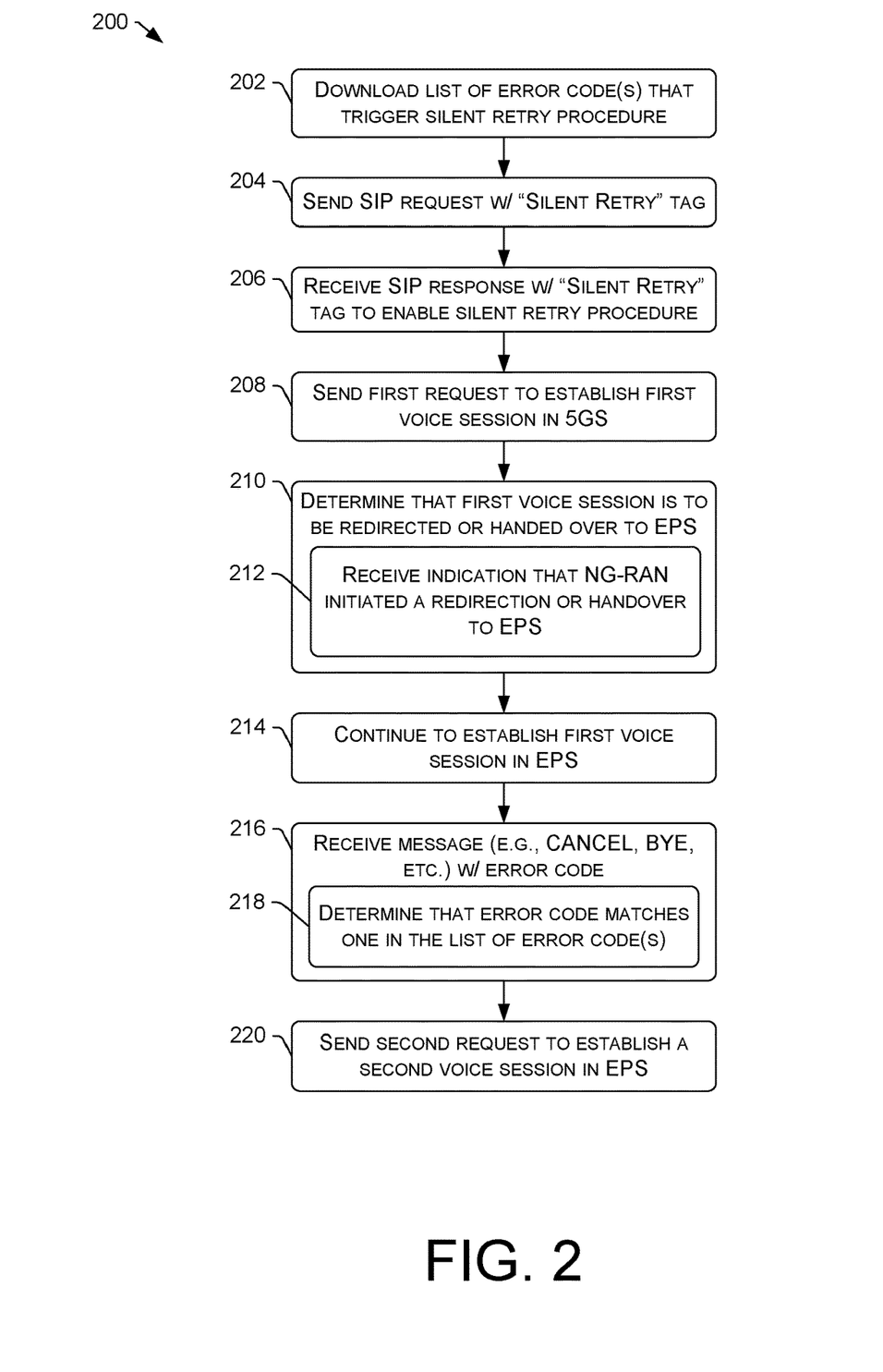
FIG. 2 illustrates a flowchart of an example process to be implemented by a UE for performing a silent retry procedure, according to various embodiments.

FIG. 2 illustrates a flowchart of an example process 200 to be implemented by a UE 100 for performing a silent retry procedure, according to various embodiments. The process 200 is described with reference to the previous figures.

At 202, a UE 100 may download a list 134 of one or more error codes from a remote system. The error code(s) in the list 134—if received in a message 130 after a voice session has moved from a preferred IP-based system (e.g., 5GS 102) to a legacy IP-based system (e.g., EPS 106)—may trigger the silent retry procedure on the UE 100, as described herein. The list 134 can include any suitable type of error code (e.g., SIP 503) and any suitable number of error codes.

At 204, the UE 100 may send, to the IMS 104, a SIP request 110 including a tag (e.g., a "SilentRetry" tag, a "VoLTESilentRedial" tag, etc.) to indicate that the UE 100 is capable of the silent retry procedure. In some examples, the SIP request 110 is sent using the SIP INVITE method a mechanism to enable the silent retry procedure on a per-voice session basis. In some examples, the SIP request 110 is sent separately from a request to establish a voice session, or not at all.

At 206, assuming the UE 100 sent the SIP request 110 at block 204, the UE 100 may receive, from the IMS 104, a SIP response 112 including the tag (e.g., a "SilentRetry" tag, a "VoLTESilentRedial" tag, etc.) or a different tag to enable the silent retry procedure. Again, blocks 204 and 206 may be omitted where the silent retry procedure is enabled on a permanent basis.

At 208, the UE 100 may send, to the IMS 104, via the 5GS 102, a first request to establish a first voice session in 5GS 102. The first request may be in the form of a SIP request using the SIP INVITE method, and it may, in some examples, be combined with the SIP request sent at block 204, or it may be a separate request sent by the UE 100.

At 210, the UE 100 may determine that the first voice session is to be redirected or handed over to EPS 106. As shown by sub-block 212, this determination may include the UE 100 receiving an indication that a NG-RAN of the 5GS 102 has initiated at least one of a redirection to EPS 106 or a handover to EPS 106. For example, an EPS-FB procedure may have been triggered, or a VoNR-to-VoLTE handover may have been initiated to cause the redirection or handover to EPS 106.

At 214, the UE 100 may continue to establish the first voice session in EPS 106. In some examples blocks 210 to 214 may involve a network initiated PDU Session modification to setup QoS flow for IMS voice reaching the NG-RAN of the 5GS 102, the NG-RAN determining to trigger a fallback to EPS 106 or to otherwise handover the voice session to EPS 106, the NG-RAN initiating a measurement report solicitation from the UE 100 including E-UTRAN as a target, the NG-RAN indicating a rejection of the PDU Session modification to setup QoS flow for IMS voice, the NG-RAN initiating a redirection or a handover to EPS 106, the UE 100 initiating a TAU procedure and/or an Attach with PDN connectivity request with request type "handover," and/or the 5GS 102 re-initiating the setup of the dedicated bearer(s) and QoS flow for IMS voice, as defined in TS 23.502.

At 216, the UE 100 may receive, from the IMS 104, a message 130 including an error code indicating that establishment of the first voice session in the EPS 106 has failed. In some examples, the message 130 received at block 216 may be a CANCEL message or a BYE message. As shown by sub-block 218, the UE 100 may compare the error code within the message 130 to the list 134 of the one or more error codes stored in memory of the UE 100, which the UE 100 previously downloaded at block 202, and the UE 100 may determine that the error code matches one of the error code(s) in the list 134.

At 220, based at least in part on receiving the message 130 at block 216 including the error code, and/or based at least in part on determining that the error code matches the one of the error code(s) in the list 134, the UE 100 may send, to the IMS 104, a second request to establish a second voice session in the EPS 106. The second request may be in the form of a SIP request using the SIP INVITE method. Furthermore, the second request may be sent at block 220 without user intervention (e.g., automatically) between the receiving of the message 130 at block 216 and the sending of the second request at block 220. In some examples, the second request may be sent at block 220 within a threshold period of time (e.g., within 5 seconds, 10 seconds, etc.) of receiving the message 130 at block 216 to ensure that the second request is sent at block 220 before the UE 100 is allowed/permitted to move back to 5GS 102. In this manner, the process 200 may increase the success rate of establishing voice sessions for UEs without overloading the network due to the selective retry mechanism using a specific error code(s).

Figure 3:
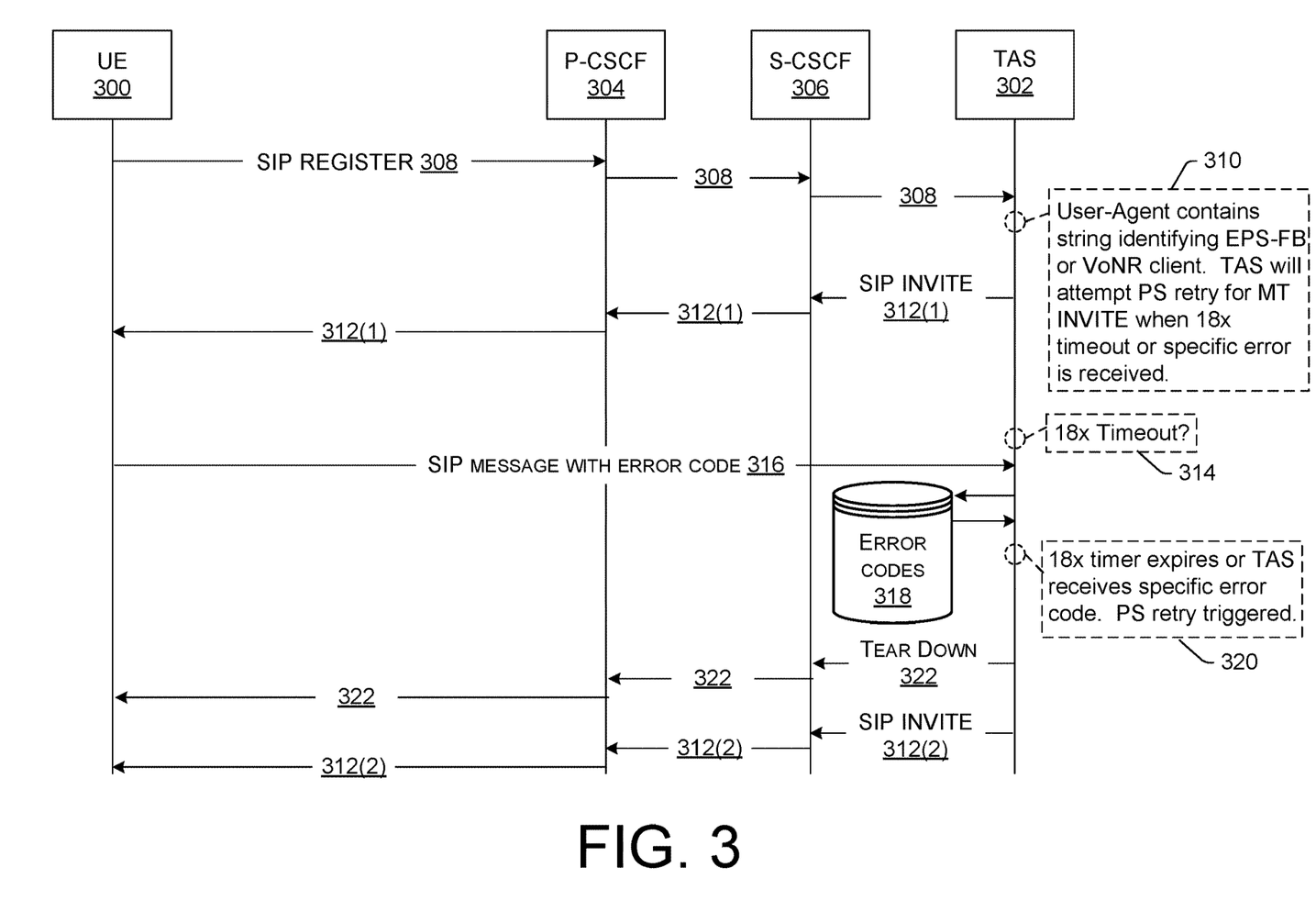
FIG. 3 is a diagram illustrating example signaling between a UE (acting as a mobile terminating (MT) UE) and example network nodes. The signaling depicted in FIG. 3 can be used to implement a silent retry procedure at a TAS, according to various embodiments. The network nodes of FIG. 3 include a proxy call session control function (P-CSCF) node, a serving CSCF (S-CSCF) node, and a TAS.

FIG. 3 is a diagram illustrating example signaling between a UE 300 (acting as a mobile terminating (MT) UE) and example network nodes. The signaling depicted in FIG. 3 can be used to implement a silent retry procedure at a TAS 302, according to various embodiments. The network nodes of FIG. 3 include a P-CSCF node 304, a S-CSCF node 306, and the TAS 302. The UE 300 may be similar to the UE 100 described above with reference to FIG. 1.

FIG. 3 illustrates that the UE 300 may request to register for one or more services of a telecommunication service provider, which may be similar to the attach procedure 108 described above with respect to FIG. 1. For example, the UE 300 may send a SIP request 308 using the SIP REGISTER method to the P-CSCF node 304, which is forwarded to the S-CSCF node 306, and ultimately to the TAS 302. Accordingly, the TAS 302 may receive the registration request 308 from the UE 300. At 310, based at least in part on information in a header field of the request 308, the TAS 302 may identify a user agent client associated with the UE 300 as an EPS-FB client or a VoNR client. For example, at 310, the TAS 302 may determine that the information in the header field of the request 308 comprises a string (e.g., a user agent string) specifying the EPS-FB client or the VoNR client, which is indicative of the UE 300 being 5G NR-capable. Having identified the user agent client as an EPS-FB client or a VoNR client, the TAS 302 may configure itself to attempt a silent retry (e.g., a packet-switched (PS) retry) with respect to the LIE 300 acting as a MT UE. In some examples, the TAS 302 may update a profile associated with the UE 300 to indicate the user agent client has been identified as the EPS-FB client or the VoNR client so that the updated profile can be referenced later during setup of a voice session.

In the example of FIG. 3, a user of another UE, such as the UE 100 of FIG. 1, may dial or select phone number associated with the UE 300 to request establishment of a voice session with a user of the UE 300 in 5GS 102. As described above, this voice session may be moved on-the-fly to EPS 106, such as if the EPS-FB procedure is triggered or a VoNR-to-VoLTE handover is triggered, and, as a result, IMS signaling related to IMS voice call establishment continues in EPS 106 for this first voice session, and the TAS 302 assigned to support the voice session may send, to the MT UE 300, a first SIP request 312(1) using the SIP INVITE method to establish a first voice session in EPS 106. For example, the SIP request 312(1) may be sent from the TAS 302 to the S-CSCF 306, which is forwarded to the P-CSCF node 304, and ultimately to the UE 300 acting as a MT UE.

If everything were to go smoothly, the TAS 302 may expect to receive a 18x response from the UE 300, such as a 180 Ringing response. In the example of FIG. 3, the UE 300 may not send anything back to the TAS 302 or may take too long to do so. In this scenario, a 18x timeout 314 may occur by the TAS 302 determining that a predetermined period of time has lapsed since the sending of the first SIP request 312(1) without the TAS 302 having received a 18x response from the MT UE 300. This 18x timeout 314 is one example of a trigger event that may initiate a silent retry procedure at the TAS 302. In another example, the TAS 302 may receive a message including an error code. The receipt of such a message including an error code is another example of a trigger event that may initiate the silent retry procedure at the TAS 302. In the example of FIG. 3, the TAS 302 is shown as receiving a SIP message 316 including the error code from the MT UE 300. It is to be appreciated, however, that the TAS 302 may receive a message including the error code from another network node that indicates establishment of the voice session with respect to the UE 300 is not going to be successful. In some examples, a list 318 of one or more error codes may be stored in memory accessible to the TAS 302 (e.g., local memory of the TAS 302), and the TAS 302 may compare the error code received in the message 316 to the list 318 of error code(s) to determine whether the error code in the message 316 matches one of the error code(s) in the list 318. Accordingly, the TAS 302 may determine, at 320, that a trigger event has occurred to initiate the silent retry procedure, such as the occurrence of a 18x timeout 314 or the receipt of a message 316 including a specific error code.

Based at least in part on the trigger event, the TAS 302 may send a message 322 to tear down the first voice session. For example, the TAS 302 may send a CANCEL message or a BYE message to the MT UE 300 to tear down the voice session, depending on the progress of session setup. In some examples, the TAS 302 may send the tear down message 322 based at least in part on the profile associated with the UE 300, which indicates the user agent client has been identified as the EPS-FB client or the VoNR client. In other words, the TAS 302 may check the profile associated with the MT UE 300 before tearing down the first voice session to make sure that the MT UE 300 is qualified as a UE 300 that can benefit from the silent retry procedure. Following the tear down message 322, the TAS 302 may send, to the MT UE 300, a second SIP request 312(2) using the SIP INVITE method to establish a second voice session in EPS 306. Accordingly, by implementing the silent, PS retry procedure at the TAS 302, as described with reference to FIG. 3, the success rate of establishing voice sessions is increased as compared to allowing UEs to revert back to 5GS 102 where they may encounter the same issue that caused the 18x timeout 314 and/or the message 316 with the specific error code.

It is to be appreciated that the technique illustrated in FIG. 3 can include various actions and message transmissions by and between the UE 300 and various network nodes in addition to the example actions and message transmission described herein and shown in FIG. 3. In general, any suitable setup procedures known to a person having ordinary still in the art can be included in the setup procedures to establish a voice session for the UE 300 acting as a MT UE. Because network topologies vary between service providing entities, the signaling employed may vary.

Figure 4:
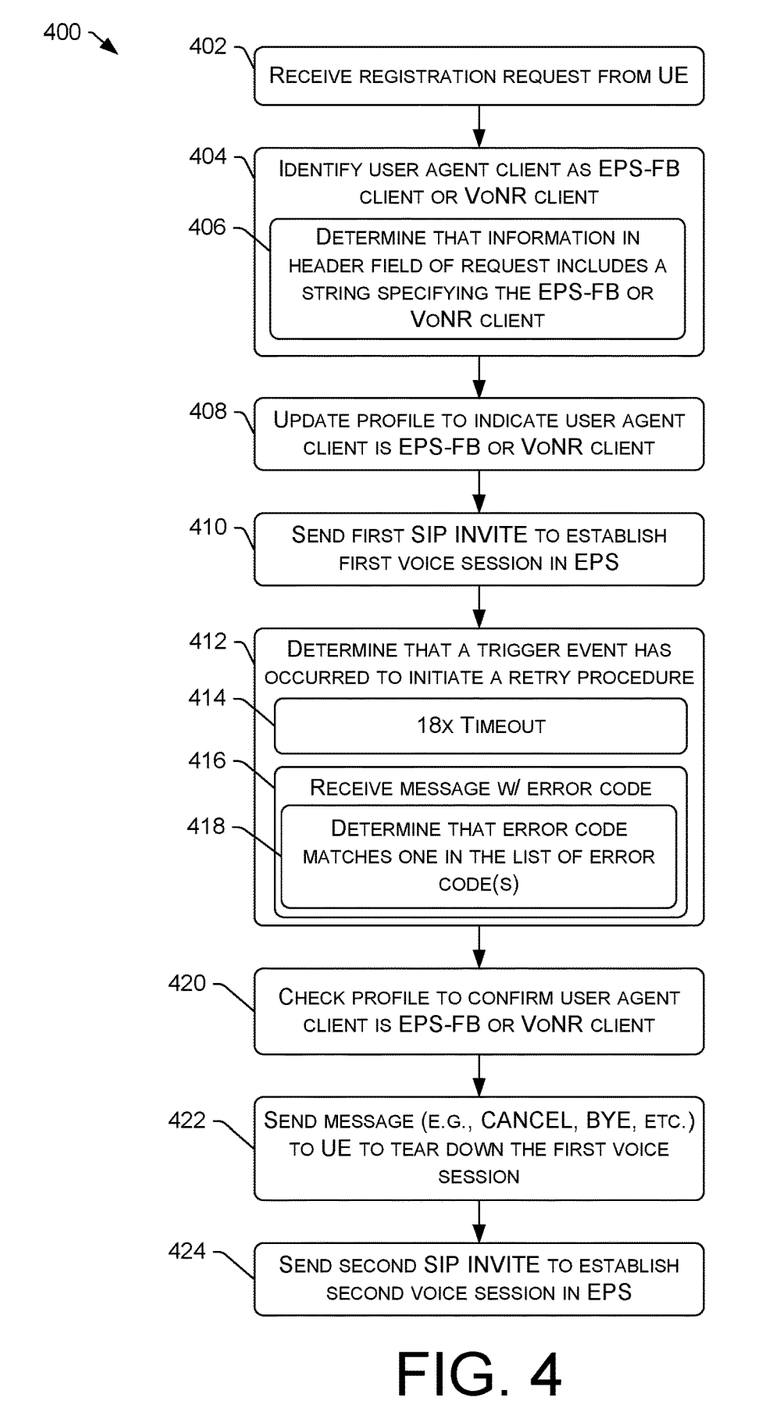
FIG. 4 illustrates a flowchart of an example process to be implemented by a TAS for performing a silent retry procedure, according to various embodiments.

FIG. 4 illustrates a flowchart of an example process 400 to be implemented by a TAS 302 for performing a silent retry procedure, according to various embodiments. The process 400 is described with reference to the previous figures.

At 402, a TAS 302 may receive, from a UE 300, a request 308 to register for one or more services of a telecommunication service provider. For example, the TAS 302 may receive, from the UE 300, a SIP request using the SIP REGISTER method. The request 308 may include a header (e.g., a User-Agent request header) including information about the user agent client associated with the UE 300.

At 404, based at least in part on the information in the header field of the request 308, the TAS 302 may identify the user agent client associated with the UE 300 as an EPS-FB client or a VoNR client. As shown by sub-block 406, in order to identify the user agent client as such, the TAS 302 may determine that the information in the header field of the request 308 comprises a string specifying the EPS-FB client or the VoNR client.

At 408, the TAS 302 may update a profile associated with the UE 300 based on the identification at block 404, such as by updating the profile to indicate that the user agent client associated with the UE 300 has been identified as the EPS-FB client or the VoNR client. This profile may be referenced later during setup of a voice session to confirm that the UE 300 is qualified to benefit from the silent retry procedure before implementing the silent retry procedure on behalf of the UE 300.

At 410, the TAS 302 may send, to the UE 300 acting as a MT UE, a first SIP request 312(1) using the SIP INVITE method to establish a first voice session in EPS 106. As described above, this may occur when another UE, such as the UE 100, initiated a voice session in 5GS 102, and the network subsequently moved the voice session to EPS 106 on-the-fly, such as by using a EPS-FB procedure or by implementing a VoNR-to-VoLTE handover.

At 412, the TAS 302 may determine that a trigger event has occurred to initiate a silent retry procedure. As shown by sub-block 414, determining that the trigger event has occurred may include determining that a predetermined period of time has lapsed since the sending of the first SIP request 312(1) without the TAS 302 having received a 18x response from the UE 300. This is sometimes referred to herein as a "18x timeout" 314. Alternatively, as shown by sub-block 416, determining that the trigger event has occurred may include the TAS 302 receiving a message including an error code. In some examples, the message received at sub-block 416 may be a message 316 received from the MT UE 300. In other examples, the message received at sub-block 416 may be a message received from another network node, the message indicating that the establishment of the voice session for the MT UE 300 is not going to be successful. As shown by sub-block 418, the TAS 302 may compare the error code received in the message at sub-block 416 to a list 318 of one or more error codes stored in memory accessible to the TAS 302, and the TAS 302 may determine whether the error code matches one of the error code(s) in the list 318 as a way of determining that the trigger event has occurred.

At 420, the TAS 302 may check the profile associated with the MT UE 300 to determine (e.g., confirm) that the profile indicates the user agent client associated with the MT UE 300 has been identified as an EPS-FB client or a VoNR client.

At 422, based at least in part on the trigger event (e.g., based at least in part on a 18x timeout or a specific error code received in a message, such as an error code matching one of the error code(s) in the list 318), and possibly based at least in part on the profile associated with the MT UE 300 indicating the user agent client has been identified as the EPS-FB client or the VoNR client, the TAS 302 may send, to the MT UE 300, a message 322 to tear down the first voice session. This message 322 may be a CANCEL message, a BYE message, or the like.

At 424, following the transmission of the tear down message 322, the TAS 302 may send, to the MT UE 300, a second SIP request 312(2) using the SIP INVITE method to establish a second voice session in EPS 106. That is, the TAS 302 may automatically (e.g., without user intervention) tear down the first voice session and then request establishment of a new voice session in EPS 106 as part of a silent, PS retry procedure to increase the success rate of establishing a voice session. This is beneficial compared to the alternative of allowing/permitting the MT UE 300 (and the MO UE) to revert to 5GS 102 where the same issue may repeatedly present itself with respect to the MT UE 300 (and the MO UE).

Figure 5:
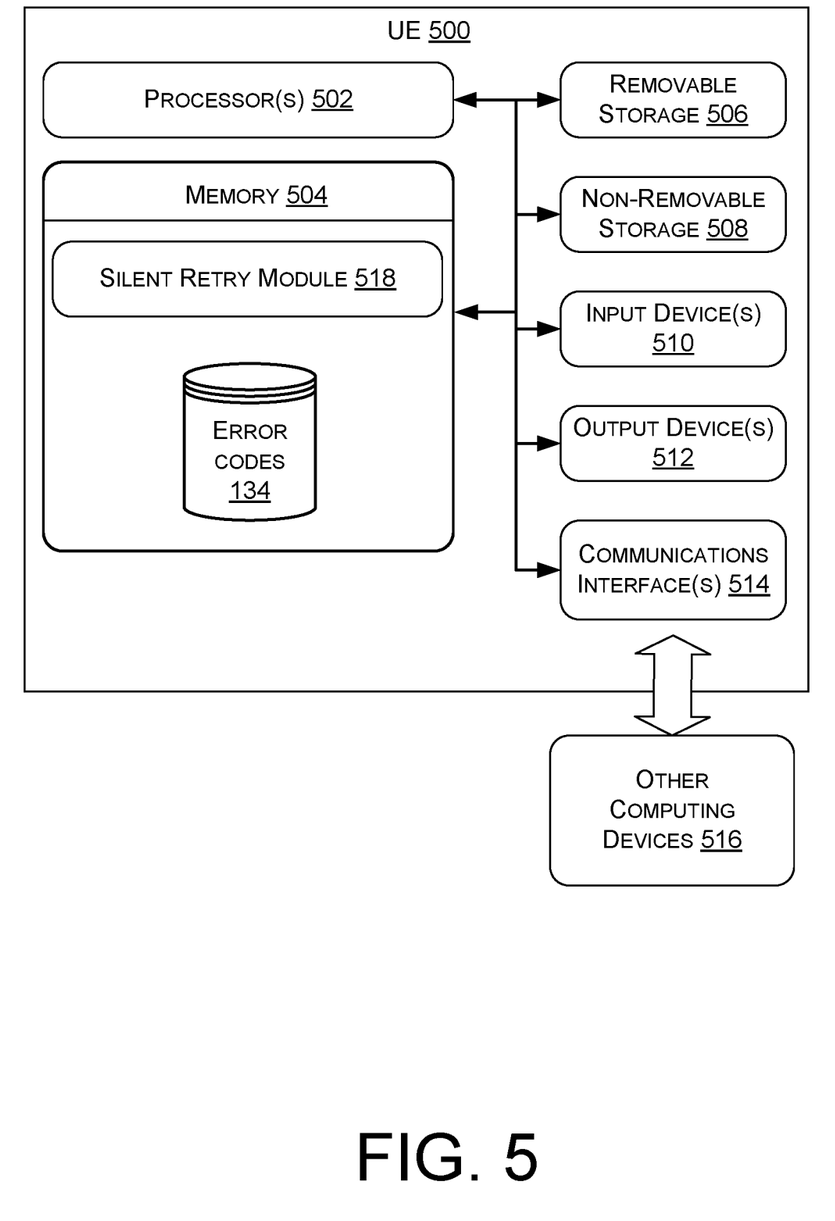
FIG. 5 is a block diagram of an example UE with logic to implement a silent retry procedure, according to various embodiments.

FIG. 5 is a block diagram of an example UE 500 with logic to implement a silent retry procedure, according to various embodiments. The UE 500 may be representative of the UE 100 or the UE 300 described herein.

As shown, the UE 500 may include one or more processors 502 and one or more forms of computer-readable memory 504. The UE 500 may also include additional storage devices. Such additional storage may include removable storage 506 and/or non-removable storage 508.

The UE 500 may further include input devices 510 (e.g., a touch screen, keypad, keyboard, mouse, pointer, microphone, etc.) and output devices 512 (e.g., a display, printer, speaker, etc.) communicatively coupled to the processor(s) 502 and the computer-readable memory 504. The UE 500 may further include communications interface(s) 514 that allow the UE 500 to communicate with other computing devices 516 (e.g., network nodes, other UEs, etc.) such as via a network. The communications interface(s) 514 may facilitate transmitting and receiving wired and/or wireless signals over any suitable communications/data technology, standard, or protocol, as described herein. For example, the communications interface(s) 514 can comprise a wired interface and/or one or more of a cellular radio, a wireless (e.g., IEEE 802.1x-based) interface, a Bluetooth® interface, and so on.

In various embodiments, the computer-readable memory 504 comprises non-transitory computer-readable memory 504 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 504 may also be described as computer storage media and may include volatile and nonvolatile, removable and non-removable media implemented in any method or technology for storage of information, such as computer readable instructions, data structures, program modules, or other data. Computer-readable memory 504, removable storage 506 and non-removable storage 508 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 500. Any such computer-readable storage media may be part of the UE 500.

The memory 504 can include a silent retry module 518 (i.e., computer-executable instructions (or logic) that, when executed, by the processor(s) 502, perform the various acts and/or processes disclosed herein). For example, the silent retry module 518 is configured to carry out the silent retry procedure on the UE 500, as described herein. The memory 504 can further be used to store list 134 of one or more error codes, which may trigger the silent retry procedure, as described herein.

Figure 6:
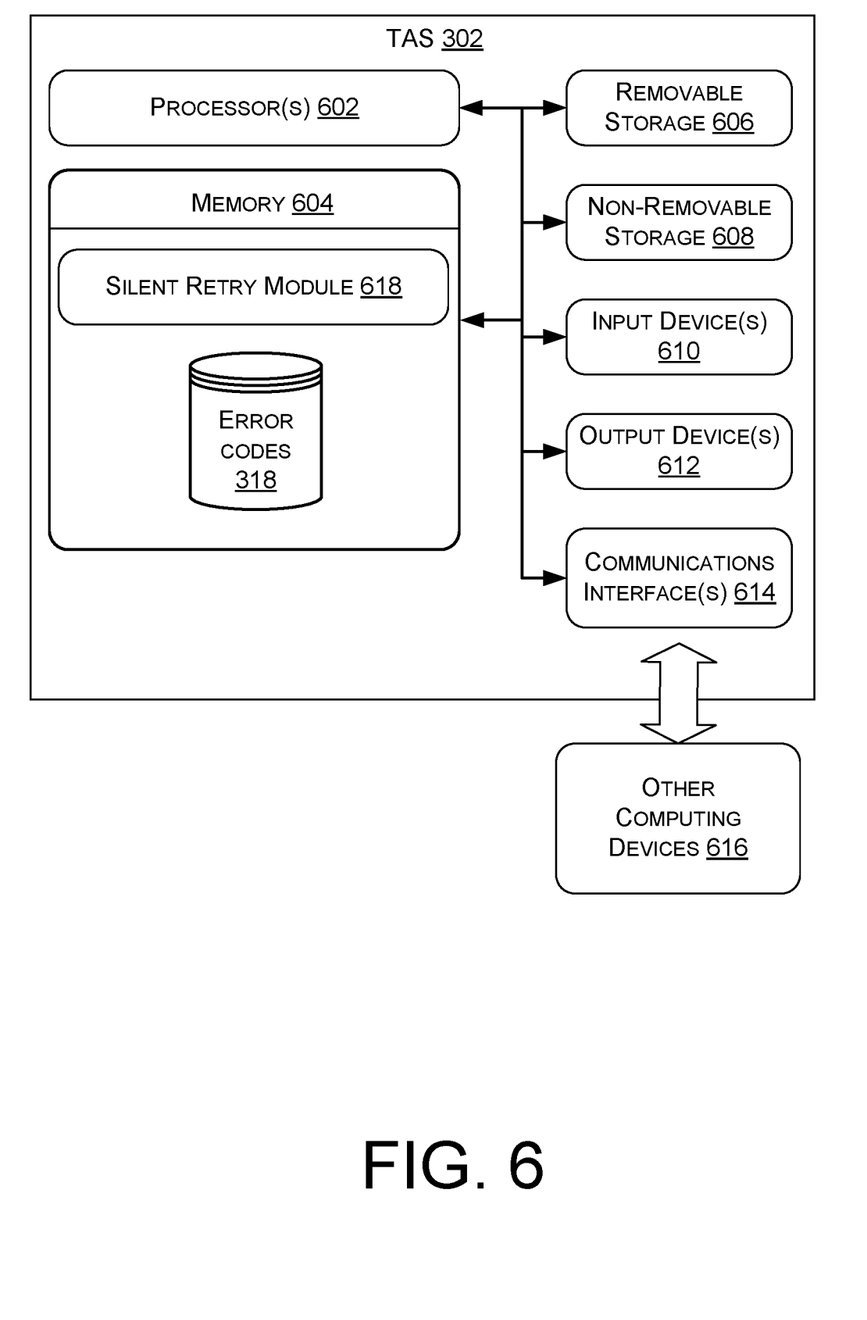
FIG. 6 is a block diagram of an example TAS with logic to implement a silent retry procedure, according to various embodiments.

FIG. 6 is a block diagram of an example TAS 302 with logic to implement a silent retry procedure, according to various embodiments. As shown, the TAS 302 may include one or more processors 602 and one or more forms of computer-readable memory 604. The TAS 302 may also include additional storage devices. Such additional storage may include removable storage 606 and/or non-removable storage 608.

The TAS 302 may further include input devices 610 (e.g., a touch screen, keypad, keyboard, mouse, pointer, microphone, etc.) and output devices 612 (e.g., a display, printer, speaker, etc.) communicatively coupled to the processor(s) 602 and the computer-readable memory 604. The TAS 302 may further include communications interface(s) 614 that allow the TAS 302 to communicate with other computing devices 616 (e.g., other network nodes, UEs, etc.) such as via a network. The communications interface(s) 614 may facilitate transmitting and receiving wired and/or wireless signals over any suitable communications/data technology, standard, or protocol, as described herein. For example, the communications interface(s) 614 can comprise a wired interface and/or one or more of a cellular radio, a wireless (e.g., IEEE 802.1x-based) interface, a Bluetooth® interface, and so on.

In various embodiments, the computer-readable memory 604 comprises non-transitory computer-readable memory 604 that generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 604 may also be described as computer storage media and may include volatile and nonvolatile, removable and non-removable media implemented in any method or technology for storage of information, such as computer readable instructions, data structures, program modules, or other data. Computer-readable memory 604, removable storage 606 and non-removable storage 608 are all examples of non-transitory computer-readable storage media. Computer-readable storage media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the TAS 302. Any such computer-readable storage media may be part of the TAS 302.

The memory 604 can include a silent retry module 618 (i.e., computer-executable instructions (or logic) that, when executed, by the processor(s) 602, perform the various acts and/or processes disclosed herein). For example, the silent retry module 618 is configured to carry out silent retry procedure on the TAS 302, as described herein. The memory 604 can further be used to store list 318 of one or more error codes, which may trigger the silent retry procedure, as described herein.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A method comprising:
    sending, by a user equipment (UE), a first request to establish a first voice session in a fifth generation system (5GS);
    determining, by the UE, that the first voice session is to be redirected or handed over to an evolved packet system (EPS);
    continuing, by the UE, to establish the first voice session in the EPS;
    receiving, by the UE, a message indicating that establishment of the first voice session in the EPS has failed, the message including an error code of a plurality of error codes, the plurality of error codes including at least one error code associated with associated with automatically retrying in the EPS and at least one error code associated with transiting back to the 5GS;
    determining, based on the error code, to retry in the EPS, wherein the error code is one of the at least one error code associated with automatically retrying in the EPS; and
    sending, by the UE, and based at least in part on the determining to retry in the EPS, a second request to establish a second voice session in the EPS, wherein the second request is a request to establish the second voice session directly in the EPS, without redirection or handover from 5GS.

2. The method of claim 1, further comprising:
    comparing, by the UE, the error code to a list of error codes stored in memory of the UE, the list of error codes comprising the plurality of error codes.

3. The method of claim 2, further comprising, prior to the sending of the first request, downloading, by the UE, the list of the one or more error codes from a remote system.

4. The method of claim 1, further comprising, prior to the sending of the first request:
    sending, by the UE, a Session Initiation Protocol (SIP) request including a tag to indicate that the UE is capable of a silent retry procedure that involves the sending of the second request based at least in part on the receiving of the message including the error code; and
    receiving, by the UE, a SIP response including the tag, or a different tag, to enable the silent retry procedure.

5. The method of claim 1, wherein the sending of the second request occurs without user intervention between the receiving of the message and the sending of the second request.

6. The method of claim 1, wherein the message comprises at least one of a CANCEL message or a BYE message.

7. The method of claim 1, wherein the determining that the first voice session is to be redirected or handed over to the EPS comprises receiving, by the UE, an indication that a next generation radio access network (NG-RAN) has initiated at least one of a redirection to EPS or a handover to EPS.

8. A user equipment (UE) comprising:
a processor; and
memory storing computer-executable instructions that, when executed by the processor, cause the UE to:
send a first request to establish a first voice session in a fifth generation system (5GS);
determine that the first voice session is to be redirected or handed over to an evolved packet system (EPS);
continue to establish the first voice session in the EPS;
receive a message indicating that establishment of the first voice session in the EPS has failed, the message including an error code of a plurality of error codes, the plurality of error codes including at least one error code associated with associated with automatically retrying in the EPS and at least one error code associated with transiting back to the 5GS;
determining, based on the error code, to retry in the EPS, wherein the error code is one of the at least one error code associated with automatically retrying in the EPS; and
send, based at least in part on the determining to retry in the EPS, a second request to establish a second voice session in the EPS, wherein the second request is a request to establish the second voice session directly in the EPS, without redirection or handover from 5GS.

9. The UE of claim 8, wherein the computer-executable instructions, when executed by the processor, further cause the UE to:
compare the error code to a list of error codes stored in memory of the UE, the list of error codes comprising the plurality of error codes.

10. The UE of claim 9, wherein the computer-executable instructions, when executed by the processor, further cause the UE to, prior to sending the first request, download the list of the error codes from a remote system.

11. The UE of claim 8, wherein the computer-executable instructions, when executed by the processor, further cause the UE to, prior to sending the first request:
send a Session Initiation Protocol (SIP) request including a tag to indicate that the UE is capable of a silent retry procedure; and
receive a SIP response including the tag, or a different tag, to enable the silent retry procedure.

12. The UE of claim 8, wherein sending the second request occurs without user intervention between receiving the message and sending the second request.

13. The UE of claim 8, wherein the message comprises at least one of a CANCEL message or a BYE message.

14. The UE of claim 8, wherein determining that the first voice session is to be redirected or handed over to the EPS comprises receiving an indication that a next generation radio access network (NG-RAN) has initiated at least one of a redirection to EPS or a handover to EPS.

15. A method comprising:
receiving, by a telephony application server (TAS), from a user equipment (UE), a request to register for one or more services of a telecommunication service provider;
identifying, by the TAS, and based at least in part on information in a header field of the request, a user agent client associated with the UE as an evolved packet system fallback (EPS-FB) client or a voice over new radio (VoNR) client;
sending, by the TAS, to the UE, a first Session Initiation Protocol (SIP) request using the SIP INVITE method to establish a first voice session in an evolved packet system (EPS);
determining, by the TAS, that a trigger event has occurred to initiate a silent retry procedure;
sending, by the TAS, to the UE, and based at least in part on the trigger event, a message to tear down the first voice session; and
sending, by the TAS, to the UE, a second SIP request using the SIP INVITE method to establish a second voice session in the EPS, wherein the second SIP request is a request to establish the second voice session directly in the EPS, without redirection or handover from 5GS.

16. The method of claim 15, wherein the determining that the trigger event has occurred comprises determining that a predetermined period of time has lapsed since the sending of the first SIP request without the TAS having received a 18x response from the UE.

17. The method of claim 15, wherein the determining that the trigger event has occurred comprises receiving, by the TAS, a second message including an error code.

18. The method of claim 17, wherein the second message is received from the UE.

19. The method of claim 17, further comprising:
comparing, by the TAS, the error code to a list of one or more error codes stored in memory accessible to the TAS; and
determining, by the TAS, that the error code matches one of the one or more error codes in the list,
wherein the sending of the message based at least in part on the trigger event comprises sending the message based at least in part on the determining that the error code matches the one of the one or more error codes in the list.

20. The method of claim 15, further comprising updating a profile associated with the UE to indicate the user agent client has been identified as the EPS-FB client or the VoNR client, wherein the sending of the message is further based at least in part on the profile indicating the user agent client has been identified as the EPS-FB client or the VoNR client.

* * * * *